Aug. 7, 1951

J. C. M. R. DAUVIN ET AL

ANTIDISTORTION DEVICE FOR RECEIVING
AND RETRANSMITTING IMPULSES

Filed May 20, 1946

2,563,311

INVENTORS
JEAN CHARLES MARIE RENE DAUVIN
HENRI LOUIS LESIGNE

BY A. D. Adams

ATTORNEY

Patented Aug. 7, 1951 2,563,311

UNITED STATES PATENT OFFICE 2,563,311

ANTIDISTORTION DEVICE FOR RECEIVING AND RETRANSMITTING IMPULSES

Jean Charles Marie René Dauvin, Paris, and Henri Louis Lesigne, Vanves, France, assignors to Compagnie Generale d'Electricite, Paris, France, a corporation of France Application May 20, 1946, Serial No. 671,032
In France June 2, 1944

4 Claims. (Cl. 179—16)

The present invention relates to devices for receiving and re-transmitting alternating current signal impulses such as dialling impulses and has more particular reference to devices of this type used in telephone circuits.

In devices of this kind as used heretofore, impulses received by a relay connected in parallel to the telephone line are distorted owing to the discharge current from the line, this discharge current being generated at the end of previous impulses and keeping the impulse-receiving relay operated during a certain period. In such devices of the prior art, provision may be made for the correction of the signalling impulse or trains of impulses by an assembly of members which are energized at the beginning of each impulse and which commence to act at the end of a time interval corresponding to the duration which the impulse should have, avoiding rapid successive pulsations of the line discharge current.

An object of the present invention is to provide an improved device capable of obviating this disadvantage and so designed as to regulate the current which passes through the receiving relay during each impulse, this device being also capable of facilitating line discharge and consequently greatly reducing its influence upon the operation of the receiving relay.

Another object of the present invention is to provide a device as aforesaid involving a high impedance input on the circuit of the impulse-receiving relay during the arrival of speech currents and conversely a small impedance input in parallel on the line immediately after each signal impulse.

Other objects will be apparent from the following description and from the accompanying drawing which exemplifies the invention and shows a suitable embodiment of the improved device.

A and B designate the two leads of a line which may be for example a telephone line and on which input alternating current signal impulses are transmitted.

The current from this alternating current impulses passes initially from the line A in series through a pair of devices E1 and E2 each of which is made up respectively of two static rectifier units C1, C2 and C'1, C'2, whereafter the current is rectified by a usual bridge rectifier set R.

Figure 1:
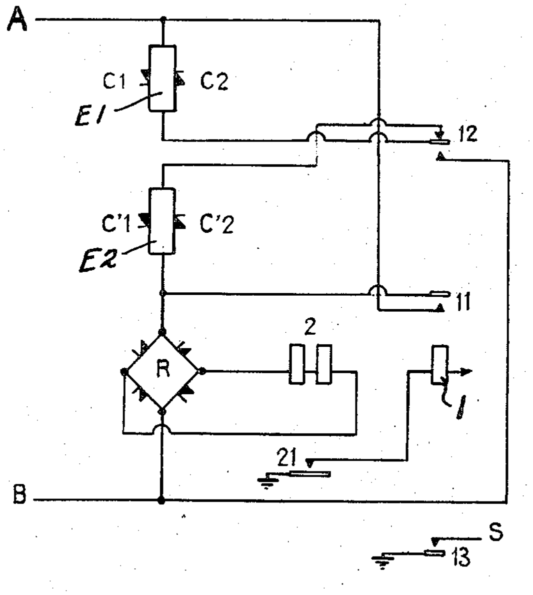
Fig. 1 is a view of the device.

The rectified current from rectifier bridge R actuates a sensitive relay 2 which in turn through its controlled contact 21 controls the relay 1 by which received impulses are re-transmitted. The relay 1 is capable of re-transmitting these impulses either as alternating current or as direct current. This re-transmitting operation may take place through a second telephone circuit or may be used for example for the local control of selecting means. This latter constructional form is shown in Fig. 1 wherein S designates the control lead connected to controlled contact 13 of relay 1.

As soon as the relay 1 has become energized, the rectifier bridge set R is directly connected across the line A—B through the closing of contact 11 in energized position while the device E1 is also connected across the line A—B through the closing of contact 12 in energized position.

The device E1 behaves as a clipper and therefore regulates the current through the relay 2. Furthermore, on completion of a given impulse, the relays 2 and 1 being still in closed position the line A, B is looped across the clipping device E1 whose impedance is sufficiently low to facilitate the passing of the line discharge current, thereby exerting no influence upon rectifier bridge R and the relay 2.

In the absence of signal impulses, no current passes through rectifier bridge R and relays 1 and 2 are deenergized and the two clipping devices E1 and E2 are connected in series through contact 12 in unenergized position and cause a high impedance to be obtained between the two line leads A, B so as to avoid any attenuation of speech currents.

Figure 2:
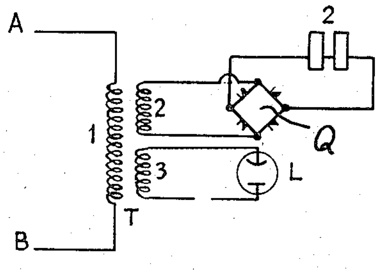
Fig. 2 is a view of a modification of this device.

In the modified embodiment of the present invention as shown in Fig. 2, T designates a three winding transformer. The winding 1 is connected across the line terminals A, B, the winding 2 feeds a rectifying bridge Q, and the impulse-receiving relay 2, while the third winding 3 is connected to a glow discharge tube L.

The tube L glows responsive to each received impulse and the assembly of this tube with the transformer acting as a saturable reactor behaves as a clipping device because the current which then flows through the winding 3 lessens the entire impedance of the assembly. Therefore the current through the relay 2 is regulated, while such impedance reduction permits a quick discharge of the line without any influence upon the relay 2.

The present invention also has in view substituting for the rectifying unit E1—E2 any other suitable device, whether simple or complex, possessing a high impedance when series connected with the relay 2, and a much lower impedance than that of the winding of this relay 2, when connected in parallel therewith to the line.

Alternatively a relay 2 may be used with a winding having a fairly high impedance and shunted by means of a low impedance as soon as it becomes operated.

It will be seen from the foregoing that the present invention imparts to the impulse-receiving relay circuit a high impedance when speech currents reach the set, and conversely a low impedance input in parallel across the line immediately after the completion of each signal impulse.

It will be apparent to those skilled in the art that our invention is susceptible of modification to adapt the same to particular conditions and all such modifications which are within the scope of the appended claims we consider to be comprehended within the spirit of our invention.

What is claimed is:

1. A signal pulse relay device for receiving alternating-current pulses and re-transmitting pulses in synchronism with the received pulses and adapted to be connected to a telephone two-wire line, comprising in series the winding of a pulse-receiving relay and a rectifier bridge inserted across the two-wires of the line, means for establishing a high impedance in series with said relay and said rectifier bridge during the application to said line of speech current and means controlled by said relay for establishing a low impedance across the two wires of said line during the transmission of said pulses.

2. In a device for transmitting speech current, receiving alternating-current pulses and retransmitting pulses in synchronism with the received pulses the combination of a line, a pulse-receiving relay connected in parallel with said line, a first pair of reverse rectifiers connected in parallel with each other, a second pair of reverse rectifiers connected in parallel with each other, means normally connecting said pairs of rectifiers in series with the actating winding of said relay, and means responsive to the initiation of one of said pulses on said line for switching off said second pair of rectifiers and for then connecting said first pair of rectifiers in parallel with said line.

3. In a signal pulse relay device adapted to be connected to a telephone line for receiving signal pulses of alternating current transmitted over said line and re-transmitting pulses in synchronism with the reception of said pulses without interference with the transmission of talking current over said line during other intervals, a two-wire line, a first pair of rectifiers connected reversely in parallel and having a relatively low impedance, a second pair of rectifiers connected reversely in parallel and having a relatively high impedance, a rectifier bridge having a first apex connected to a first terminal of said second pair and having its opposite apex connected to a first wire of said line, a first relay having its actuating winding connected across the two other apices of said rectifier bridge, a second relay having its actuating winding connected for actuation by a controlled contact of said first relay in actuated condition, said first pair having a first terminal connected to the second wire of said line, a connection between said second wire and said first apex through a front contact of said second relay, a connection between the second terminal of said first pair and the second terminal of said second pair through a rest contact of said second relay and a connection between said second terminal of said first pair and said first wire through a front contact of said second relay.

4. A device according to claim 3, the resistance of said first pair having a value so small with relation to the resistance of the actuating winding of said first relay that during the reception of signal pulses, the current through the winding of said first relay is just sufficient to hold said first relay closed, whereby said first relay releases instantaneously upon the cessation of said received signal impulses.

JEAN CHARLES MARIE RENÉ DAUVIN.
HENRI LOUIS LESIGNE.

REFERENCES CITED

The following references are of record in the file of this patent:

UNITED STATES PATENTS

| Number | Name | Date |
|---|---|---|
| 1,831,730 | Ahlberg | Nov. 10, 1931 |
| 1,906,338 | Saville | May 2, 1933 |
| 1,908,574 | Trechcinski | May 9, 1933 |
| 1,917,403 | Stich | July 11, 1933 |
| 2,218,659 | Saville | Oct. 29, 1940 |
| 2,235,343 | Vosper | Mar. 18, 1941 |
| 2,292,371 | Ferrell | Aug. 11, 1942 |
| 2,307,818 | Beale | Jan. 12, 1943 |

Certificate of Correction

Patent No. 2,563,311 August 7, 1951

JEAN CHARLES MARIE RENE DAUVIN ET AL.

It is hereby certified that error appears in the above numbered patent requiring correction as follows:

In the grant, line 17, strike out "OF SEVENTEEN YEARS"; same line, after "GRANT" insert until *June 2, 1964*; in the heading to the printed specification, between lines 9 and 10, insert the following: *Section 1, Public Law 690, August 8, 1946. Patent expires June 2, 1964*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*